(12) United States Patent
Hermann et al.

(10) Patent No.: US 6,552,810 B1
(45) Date of Patent: Apr. 22, 2003

(54) OPTICAL MEASURING SYSTEM

(75) Inventors: Michael Hermann, Tacherting (DE);
Walter Huber, Traunstein (DE);
Wolfgang Holzapfel, Obing (DE);
Volker Höfer, Stein/Traun (DE)

(73) Assignee: Dr. Johannes Hiedenhein GmbH, Treunreut (DE)

( * ) Notice: Subject to any disclaimer, the term of this patent is extended or adjusted under 35 U.S.C. 154(b) by 0 days.

(21) Appl. No.: 09/496,984

(22) Filed: Feb. 2, 2000

(30) Foreign Application Priority Data

Feb. 4, 1999 (DE) .......................... 199 04 470
Dec. 1, 1999 (DE) .......................... 199 57 777

(51) Int. Cl.[7] .................... G01B 11/14; G01B 11/02; H01J 3/14; G01N 21/86

(52) U.S. Cl. .................... 356/614; 356/499; 250/237 G; 250/559.29

(58) Field of Search ................ 356/614, 616, 356/617, 494, 499, 488; 250/559.44, 231.14, 237.6, 227.19, 559.29

(56) References Cited

U.S. PATENT DOCUMENTS

| 3,812,352 A | 5/1974 | MacGovern |
| 4,079,252 A | 3/1978 | Brake |
| 4,176,276 A | 11/1979 | Kaul et al. |

(List continued on next page.)

FOREIGN PATENT DOCUMENTS

| DE | 1 798 368 | 2/1972 |
| DE | 27 14 324 | 10/1978 |
| DE | 26 53 545 | 1/1979 |

(List continued on next page.)

OTHER PUBLICATIONS

Application No. 09/208,127, Mayer et al., Filing Date of Dec. 9, 1998—Pending.

*Primary Examiner*—Richard A. Rosenberger
*Assistant Examiner*—Gordon J Stock, Jr.
(74) *Attorney, Agent, or Firm*—Brinks Hofer Gilson & Lione

(57) ABSTRACT

An optical position measuring system for determining the relative position of a first object which can be moved with respect to a second object along a measuring direction includes at least one periodic measuring graduation, which is connected to the first object and a scanning unit which is connected with the second object. The scanning unit includes a light source emitting beams of light, at least one scanning graduation and a detector arrangement in a detector plane. The detector arrangement includes several radiation sensitive detector elements for scanning a periodic fringe pattern resulting from the interaction of the beams of light emitted by the light source with the at least one periodic measuring graduation and the at least one scanning graduation, wherein the detector plane is arranged spaced at a distance $Z_n$ from the last graduation passed and the distance $Z_n$ is calculated from the following equation:

$$1/Z_n + 1/Z_Q = 1/((n+\eta)*d_{VTO}),$$

wherein:

$Z_Q$: is the distance of the last graduation passed from a real and virtual source point of the periodic fringe pattern, $n = 0, 1, 2, 3, \ldots$, $\eta$: is the phase shift in fractions of 360° of the periodic fringe pattern exiting at the last graduation passed into different directions, $$d_{VTO} = (TP_{eff} * \Lambda_{vernier})/\lambda,$$

wherein $T_{Peff}$: is an effective graduation period of the scanning device, which correctly describes the directions of the orders of diffraction exiting at the graduations last passed, which have sufficient intensity, $\lambda$: wavelength of said light source, $\Lambda_{vernier}$: period of said partial vernier fringe at the location of the last graduation passed.

19 Claims, 6 Drawing Sheets

U.S. PATENT DOCUMENTS

| | | |
|---|---|---|
| 4,519,709 A | 5/1985 | Nelle |
| 4,606,642 A | 8/1986 | Nelle |
| 4,776,701 A | 10/1988 | Pettigrew |
| 4,912,322 A | 3/1990 | Ichikawa |
| 5,026,164 A | 6/1991 | Ichikawa |
| 5,064,290 A * | 11/1991 | McMurtry et al. ........... 356/499 |
| 5,067,816 A | 11/1991 | Ichikawa |
| 5,079,418 A | 1/1992 | Michel et al. |
| 5,206,704 A | 4/1993 | Huber et al. |
| 5,332,896 A | 7/1994 | Holzapfel |
| 5,430,546 A | 7/1995 | Huber |
| 5,493,399 A | 2/1996 | Meyer et al. |
| 5,495,336 A * | 2/1996 | Nose et al. ................. 356/616 |
| 5,559,602 A | 9/1996 | Nyui |
| 5,576,537 A * | 11/1996 | Holzapfel et al. ...... 250/237 G |
| 5,648,658 A * | 7/1997 | Holzapfel et al. ...... 250/237 G |
| 5,689,336 A * | 11/1997 | Huber ........................ 356/499 |
| 5,841,134 A | 11/1998 | Burgschat et al. |
| 5,977,539 A | 11/1999 | Holzapfel et al. |
| 5,994,692 A | 11/1999 | Holzapfel |
| 6,097,490 A * | 8/2000 | Holzapfel et al. ...... 250/237 G |
| 6,175,414 B1 * | 1/2001 | Holzapfel et al. ........... 356/620 |
| 6,198,534 B1 * | 3/2001 | Hofer et al. ............. 250/237 G |
| 6,259,531 B1 * | 7/2001 | Takamiya et al. ............ 356/499 |
| 6,445,456 B2 * | 9/2002 | Speckbacher et al. ...... 356/499 |

FOREIGN PATENT DOCUMENTS

| | | |
|---|---|---|
| DE | 33 25 803 | 1/1985 |
| DE | 37 27 188 | 4/1988 |
| DE | 39 04 898 | 8/1989 |
| DE | 195 27 287 | 1/1997 |
| EP | 0 577 090 A2 | 1/1994 |
| EP | 0 577 090 A3 | 3/1994 |
| WO | WO 97/16704 | 5/1997 |

* cited by examiner

OPTICAL MEASURING SYSTEM

Applicants claim, under 35 U.S.C. §119, the benefit of priority of the filing date of Feb. 4, 1999 of a German patent application, copy attached, Serial Number 199 04 470.8, filed on the aforementioned date, the entire contents of which is incorporated herein by reference. Applicants also claim, under 35 U.S.C. §119, the benefit of priority of the filing date of Dec. 1, 1999 of a German patent application, copy attached, Serial Number 199 57 777.3, filed on the aforementioned date, the entire contents of which is incorporated herein by reference.

BACKGROUND OF THE INVENTION

1. Field of the Invention

The present invention relates to an optical position measuring system which is suitable for the precise determination of the relative position of two objects which can be moved with respect to each other.

2. Discussion of Related Art

Incremental position measuring systems are known, wherein the scanning graduations on the scale and the scanning sides, i.e., the measuring graduation and one or several scanning graduations, have different graduation periods. If these graduations are illuminated by a light source, a periodic fringe pattern results in one detector plane, which can be detected by means of a suitable detection arrangement. In this case, the periodic fringe pattern is the result of interactions of the beam emitted by the light source and the various graduations in the beam path. This fringe pattern will be called a vernier fringe pattern in what follows, wherein the periodicity of this fringe pattern is defined by the vernier period.

In connection with the manner of generating the vernier fringe pattern, these, for one, can be so-called imaging position measuring systems with relatively coarse graduation periods on the measuring graduation and the scanning side in this case. The resultant vernier fringe pattern is here essentially generated by the cast shadows. As a rule, these systems include a measuring graduation, as well as a scanning graduation; in this connection reference is made to DE 195 27 287A or DE 1 796 368 A1, for example. Scanning of the resultant vernier fringe pattern with a relatively large vernier period is respectively performed with the aid of suitably arranged quadrant detectors. Moreover, reference is made to DE 26 53 545 in this connection.

Furthermore, the resultant vernier fringe pattern, in principle, can also be generated by means of an interferential position measuring system, wherein the graduation structures on the graduation and the scanning side have very small graduation periods. With such measuring systems, the scanned vernier fringe pattern in the detector plane consists of partial beams, which are diffracted at the graduations used and come to interference. Reference is made in this connection to DE 27 14 324, for example.

SUMMARY OF THE INVENTION

It is now intended to disclose imagining position measuring systems, as well as interferential position measuring systems, for the generation of such vernier fringe patterns, which meet defined requirements.

It should be assured in principle that, in the case of a relative movement, sufficiently well modulated scanning signals result from scanning the vernier fringe pattern. Possible contamination of a portion of the graduation via such sources as dirt, soil, oil or coolants, should not have a negative effect on the scanning signals to the extent possible. Moreover, a certain flexibility regarding the position of the detector plane is required, since, for reasons of existing structural conditions, sometimes the detector plane cannot always be arranged immediately behind the last graduation of the position measuring system which was passed. The latter is of particular importance in view of compactly constructed scanning units. It should furthermore be noted that with smaller periods of the vernier fringe pattern in imaging systems, the distance between the last graduation which was passed and the detector plane should be as small as possible. The reasons for this are the higher orders of diffraction which lead to a fringe image with only low contrasts. However, in actual use such a short distance can hardly be realized; it would be possible that bonding wires of the respective detector elements, which project past the detector elements, might be damaged in this case, etc.

In the case of interferential systems, a spatial separation of the exiting orders of diffraction by means of lenses is often required. However, even in the case of different graduation periods of the graduations used, no vernier fringes appear in the focal planes of the lenses of such position measuring systems.

An optical position measuring system for determining the relative position of a first object which can be moved with respect to a second object to along a measuring direction which meets these requirements includes at least one periodic measuring graduation, which is connected to the first object and a scanning unit which is connected with the second object. The scanning unit includes a light source emitting beams of light, at least one scanning graduation and a detector arrangement in a detector plane. The detector arrangement includes several radiation sensitive detector elements for scanning a periodic fringe pattern resulting from the interaction of the beams of light emitted by the light source with the at least one periodic measuring graduation and the at least one scanning graduation, wherein the detector plane is arranged spaced at a distance $Z_n$ from the last graduation passed and the distance $Z_n$ is calculated from the following equation:

$$1/Z_n + 1/Z_Q = 1/((n+\eta)^* d_{VTO})),$$

wherein:

$Z_Q$: is the distance of the last graduation passed from a real and virtual source point of the periodic fringe pattern, n=0, 1, 2, 3, . . . , η: is the phase shift in fractions of 360° of the periodic fringe pattern exiting at the last graduation passed into different directions, $$d_{VTO} = (TP_{eff}{}^* \Lambda_{vernier})/\lambda,$$

wherein $TP_{eff}$: is an effective graduation period of the scanning device, which correctly describes the directions of the orders of diffraction exiting at the graduations last passed, which have sufficient intensity, λ: wavelength of said light source, $\Lambda_{vernier}$: period of said partial vernier fringe at the location of the last graduation passed.

The steps in accordance with the invention, in particular on the part of the detector arrangement, now assure a high-resolution generation of the displacement-dependent scanning signals, which is insensitive to contamination, or respectively insensitive to malfunctions. This is assured by means of the appropriately designed detector arrangement, since possible contamination of the graduation has equal effects on the different phase-shifted signal portions to a large degree.

Furthermore, knowing the optimal position of the detector plane results in a definite flexibility in view of the most diverse structural situations. For example, it is no longer absolutely necessary to place the detector arrangement directly following the last graduation which was respectively passed through; instead, by means of the present invention that there are further options for arranging the detector elements, which also provide sufficiently well modulated scanning signals.

The result of this in the end is the possibility of realizing a very compactly constructed scanning unit with a simultaneously great signal contrast, or respectively degree of modulation.

In the same way, knowing the optimal position of the detector plane, it is now possible to disclose an interferential position measuring system, which provides a vernier fringe pattern on the scanning side. It should furthermore be noted as an advantage of the interferential position measuring systems in accordance with the invention, in which no separation of the different orders of diffraction is performed, that all signal portions are equally affected, if the diffraction properties should change over the length of the graduation.

It is moreover possible in this way to generate signals with respective phase shifts of 90° in interferential systems, which can be further processed in standard electronic evaluation devices. Furthermore, by means of the very precise generation of differential mode signals it is possible to eliminate the second harmonic, which otherwise causes errors in the subsequent signal interpolation.

The inventive concepts can of course also be applied to rotary, as well as linear position measuring systems. It is also possible to design position measuring systems in accordance with the invention, which operate in incident or transmitted light.

Further advantages as well as details of the optical position measuring systems in accordance with the invention ensue from the following description of several exemplary embodiments by means of the attached drawings.

DETAILED DESCRIPTION OF THE INVENTION

Figure 1:
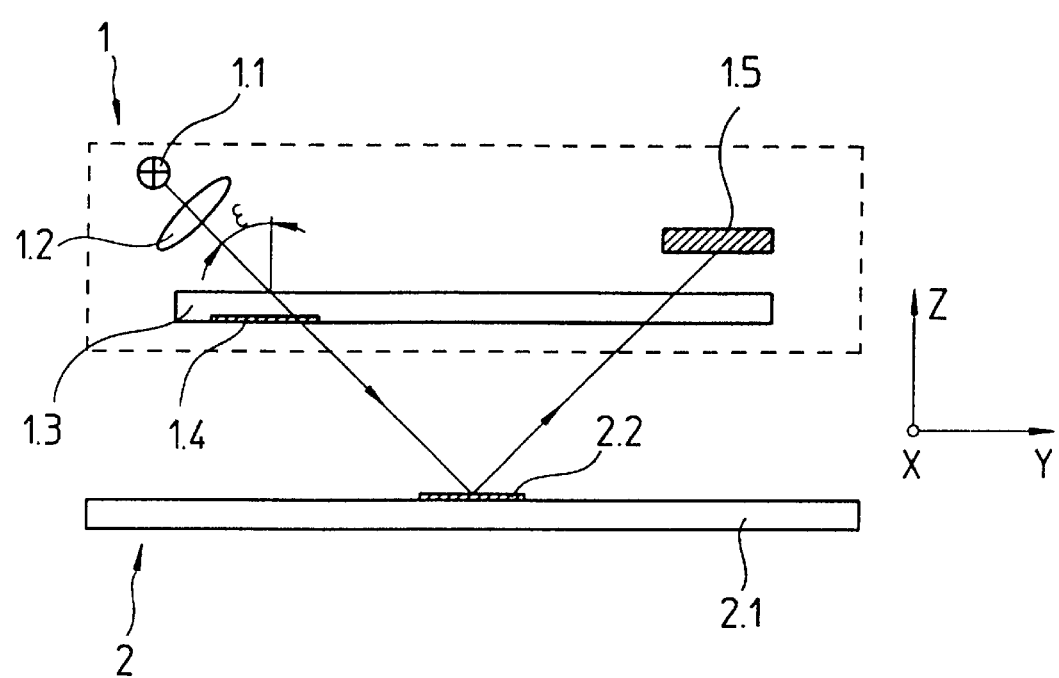
FIG. 1 shows the basic structure of a first exemplary embodiment of a position measuring system in accordance with the invention, designed as an imaging position measuring system.

A first exemplary embodiment of the optical position measuring system in accordance with the invention will be explained by means of FIGS. 1 and 2. Shown here in FIG. 1 is an imaging optical position measuring system in a schematic lateral view. Essentially, the optical position measuring system comprises a scanning unit 1 and a scale 2 with a measuring graduation 2.2 and a graduation support 2.1. The scanning unit 1 and the scale 2 are connected with two objects, which can be moved in relation to each other and whose relative position with respect to each other is to be determined. These can be, for example, a tool and a workpiece in a numerically controlled machine tool. In the exemplary embodiment represented, the scanning unit 1 and the scale 2 can be displaced in the x-direction with respect to each other, wherein x is oriented perpendicularly with respect to the drawing plane.

The scanned measuring graduation 2.2 includes of a known incident light incremental graduation on a graduation support 2.1 with alternating partial reflecting and non-reflecting areas arranged in the measuring direction x, whose longitudinal axes are arranged in the y-direction. The width of a reflecting partial area, including the width of a non-reflecting partial area in the measuring direction x, is to be understood as the graduation period $TP_M$ of the measuring graduation 2.2. Therefore, in this exemplary embodiment the scanned measuring graduation 2.2 is designed as a pure amplitude grating; the graduation period $TP_M$ has been selected as $TP_M=20.00$ μm, the partial area ratio τ, i.e. the ratio of the width of a reflecting partial area to the graduation in the measuring direction x, is τ=0.5.

In the exemplary embodiment shown in FIG. 1, the scanning unit 1, which can be displaced in relation to at least one measuring graduation 2.2, comprises a light source 1.1, an optical collimator device 1.2, a transparent scanning plate 1.3 with at least one scanning graduation 1.4 having the scanning graduation period $TP_A$, as well as a detector arrangement 1.5. The optical axis of the light source 1.1 is arranged on the scanning plate 1.3 tilted in the drawing plane by an angle ε=30° with respect to a normal line. In this embodiment, the scanning graduation 1.4 is embodied as a phase grating and has a graduation period $TP_A=18.52$ μm (thus $TP_M \neq TP_A$), the ratio τ of the width of a bar of the graduation to the graduation period is selected to be τ=0.5, the phase depth ψ=π/2. For the sake of completeness, the values η and β for this exemplary embodiment, which will be explained in greater detail in what follows, with respect to the case of an imaging system in case of collimated illumination are: η=0, β=1.

After being collimated by the optical collimator device 1.2, the beams emitted by the light source 1.1 first pass through the transparent scanning plate 1.3, run through the phase grating scanning graduation 1.4 and then impinge on the reflectively designed measuring graduation 2.2. From there, the beams are reflected back in the direction of the scanning plate 1.3 and pass through the scanning plate 1.3 in an optically ineffectual transparent window area adjoining the actual scanning graduation 1.4 before reaching the detector arrangement 1.5 in the detector plane. The detection of the periodic fringe pattern, or respectively of the scanning signals, which were modulated as a function of their displacement, takes place there, and possibly also the pre-processing of these signals before they are transmitted to a downstream located evaluation unit (not shown).

Essential steps of the invention will now be explained with the aid of the representation in FIG. 2. The latter represents, in schematic form, a portion of the detector arrangement 1.5 of the optical position measuring system in the detector plane, as well as the intensity distribution of a vernier fringe pattern scanned by means of it.

The detector arrangement 1.5 includes several radiation-sensitive detector elements D1 to D20, which are arranged next to each other in the measuring direction x. The individual detector elements D1 to D20 all have the same geometry in the shape of a narrow rectangle, whose longitudinal axis is oriented in the detector plane in the y-direction, i.e. perpendicular to the measuring direction x. A total of twenty individual detector elements have been arranged in the measuring direction x over the length $L_{DET}$ provided for the detector device, and they are combined into five groups in blocks of four detectors. In the exemplary embodiment shown with collimated illumination, each block B1 to B5 is of a length $\Lambda_{vernier}$ in the measuring direction x, which corresponds to the period of the generated fringe pattern in the detector plane, i.e. $L_{DET}=k*\Lambda_{vernier}$, wherein k=5 applies in the represented example. Therefore, in what follows, the value $\Lambda_{vernier}$ will be called the vernier-period.

Generally N detector elements are respectively arranged within the distance $\beta*\Lambda_{vernier}$, wherein it is possible to take a possible non-collimated illumination into consideration by means of the correction factor $\beta$, which will be explained in detail later. In the above case, with collimated illumination, $\beta=1$ therefore applies, while the case of non-collimated illumination will be described by $\beta \neq 1$; the exact derivation of the correction factor $\beta$ will follow in the course of the description.

The distance between adjoining detector elements D1 to D20 will be designated as $d_{DET}$, and in the general case $d_{DET}=(n+\Delta\psi/360°)*\Lambda_{vernier}$. In this case n=0, 1, 2, 3 . . . , while $\Delta\psi$ identifies the phase shift of the detected signals from adjoining detector elements. In the represented exemplary embodiment, $d_{DET}=114*\Lambda_{vernier}$, i.e. n=0 and $\Delta\psi=90°$.

In the case of collimated illumination of an optical position measuring system with several measuring graduations and/or scanning graduations—just called graduations in what follows—and in accordance with appropriately predetermined graduation periods TPi of the various graduations, the mentioned vernier period $\Lambda_{vernier}$ results in a general form in accordance with the following Equation (1):

$$\Lambda_{Vernier} = 1 \bigg/ \left( \sum_{i=1}^{M} ((n_i - n'_i)/TP_i) \right) \quad \text{Equation 1}$$

wherein $n_i$: means appearing orders of diffraction of a first partial beam at a graduation, $ni'$: means appearing orders of diffraction of a second partial beam at a graduation, $TP_i$: means a graduation period of the respective graduation, M: means the number of graduations passed through.

It is presupposed here that, aside from the optical collimator device 1.2 represented also in FIG. 1, no further optical elements are arranged in the beam path, which possibly might affect the collimation of the beams.

In the example of FIG. 1 with the measuring graduations and scanning graduations 2.2, 1.4, the vernier period $\Lambda_{vernier}$ results from the predetermined graduation periods $TP_M$ and $TP_A$ of the scanning graduations and measuring graduations and M=2 in accordance with Equation (1) as:

$$\Delta\text{vernier}=1/((1/TP_A)-(1/TP_M)).$$

It follows from this relationship that the vernier period $\Lambda_{vernier}$ of the resultant vernier fringe pattern is less the more the graduation periods $TP_A$ and $TP_M$ of the scanning graduation and measuring graduation differ from each other.

The vernier period $\Lambda_{vernier}$, which was analytically given above for the case of collimated illumination, can be clearly defined in that it is understood in principle to be the period of the resultant (partial) fringe pattern in the plane of the last graduation passed through.

In the represented exemplary embodiment, respectively four individual detector elements are provided within the detector arrangement 1.5 at the above mentioned distance $d_{DET}$. In the course of scanning the vernier fringe pattern, adjoining detector elements provide partial scanning signals which are respectively phase-shifted by 90°.

In the general case of k detector elements per block B1 to B5, partial scanning signals, which are phase-shifted by 360°/k, therefore result from adjoining detector elements.

Figure 2:
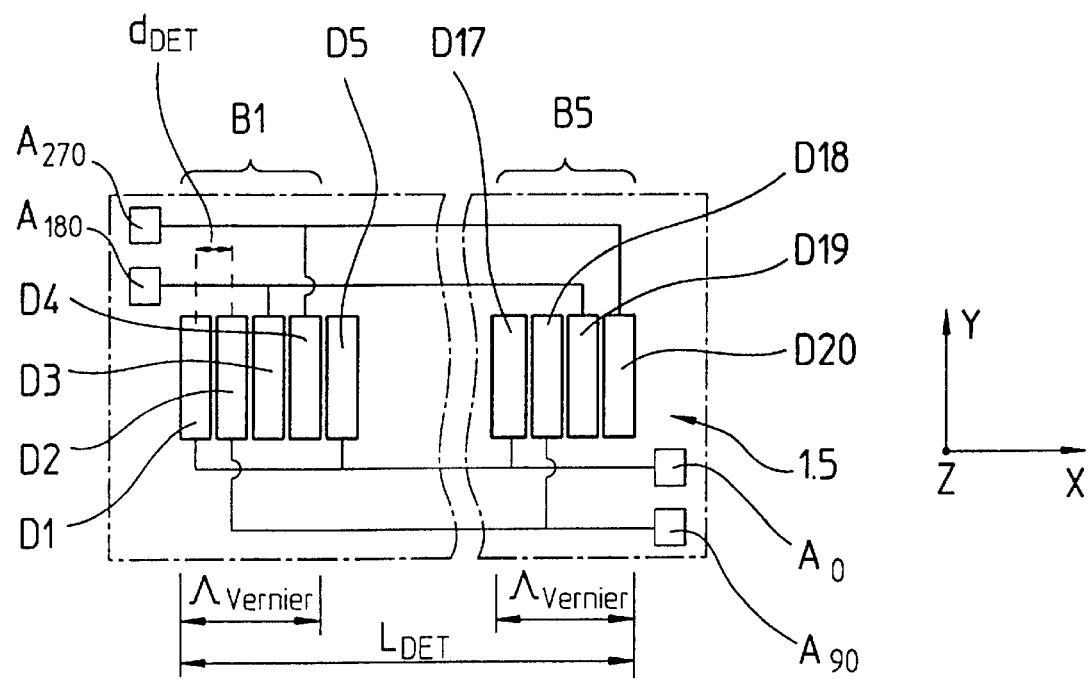
FIG. 2 is a representation of the detector plane of the exemplary embodiment of the optical position measuring system of the invention in FIG. 1 in connection with the scanned vernier fringe pattern.
Figure 2:
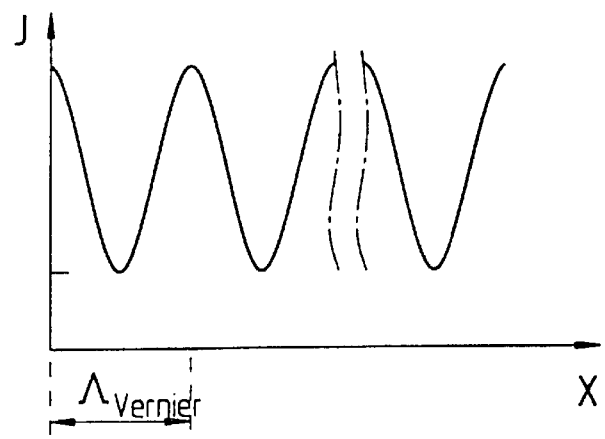

As can also be seen in the representation in FIG. 2, those detector elements D1 to D20 of the different blocks B1 to B5 are wired together, or conductingly connected on the outlet side, which provide in-phase output signals, or respectively partial scanning signals. The scanning signals $A_0, A_{90}, A_{180}$ and $A_{270}$ resulting in the end from this are further processed in a known manner on the evaluation side. For this purpose contacting areas are provided on both long sides of the detector arrangement 1.5, where the generated scanning signals $A_0, A_{90}, A_{180}$ and $A_{270}$ can be tapped.

In a typical exemplary embodiment of such a detector arrangement, a vernier period of 250 μm is preselected and is intended to be scanned. A total of ten blocks with respectively four detector elements is used for this purpose, i.e., the length $L_{DET}$ inside the detector arrangement in the measuring direction x is $L_{DET}=10*250$ μm=2.5 mm. The width of a detector element in the x-direction is selected to be 47.5 μm, the length in the y-direction to be 1.8 μm. The distance $d_{DET}$ between the centers of adjoining detector elements in the x-direction is 62.5 μm.

The phase distance $\Delta\phi$ between the output signals of adjoining detector elements is generally $$\Delta\phi=(m_1+m_2/k)=360°.$$

Here, the following applies for the various values:

$m_1=0, 1, 2, 3 \ldots$, $m_2=1, 2, 3 \ldots, (k-1)$.

While in the exemplary embodiment shown, a total of four phase-shifted scanning signals $A_0$ to $A_{270}$ have been detected and further processed, it is of course possible within the framework of the present invention to vary the number and/or the width of the detector elements, or, respectively, the distances per block between them, so that then three scanning signals, phase-shifted by 120°, result, for example, which can be further processed, etc. Of course, there are also variation options in regard to the number of blocks with detector elements used in the detector arrangement. Accordingly, in this manner it is possible to set the number of phase-shifted scanning signals to be generated, as well as the corresponding phase relationships between the scanning signals.

So-called "single field scanning" can also be realized when scanning vernier fringe patterns by means of the multitude of connected detector elements of one phase relationship, which in turn is arranged interspersed with the detector elements of the other phase relationship. In the course of such "single field scanning", all phase-shifted signal portions of the scanning signals from the same scanned area of the graduation are obtained. Local contamination of the graduation essentially has the same effect on all signal portions; therefore no interpolation errors result at the contaminated location, i.e. an essentially more accurate measuring system is the result. A similar advantage can also be cited in regard to possible graduation errors.

The quality of respective "single field scanning" is a function of the generated vernier period. The smaller the vernier period, the more evenly are the mentioned errors on the basis of graduation inaccuracies, or, respectively, contamination, distributed over all phase-shifted signal portions. In determining the dimensions of such a position measuring system it is therefore preferably attempted to scan the smallest possible vernier periods by means of appropriate detector arrangements.

As already indicated above, besides the definite outlay of the detector arrangement it is moreover important that, as shown in FIG. 2, the detector arrangement is spatially arranged with regard to the other components of the position measuring system of the invention in such a way, that a sufficient degree of modulation of the detected scanning signals, or respectively a sufficient contrast in the vernier fringe pattern, results. In this connection, the distance Z of the detector plane from the respective last graduation of the position measuring system passed through, or respectively the last effective one, is particularly relevant here. Depending on the embodiment of the optical position measuring system of the invention, the last graduation passed through, or, respectively, the last effective one, can be a scanning graduation or the measuring graduation. In what follows, the distance Z from this graduation last passed through will be understood to be the normal line distance between the plane with the graduation last passed through, or respectively last effective, and the detector plane.

It was now found within the framework of the present invention that in principle a reduction of the contrast in the generated vernier fringe pattern occurs with an increasing distance Z from the graduation last passed. Here, the reduction in contrast is all the more marked, the smaller the graduation periods of the scanning and measuring graduations used are, and the smaller the vernier periods of the vernier fringe pattern are. Therefore, with high-resolution position measuring systems of this kind in particular, the problem of the suitable arrangement of the detector plane occurs, in order to assure a sufficient contrast in the vernier fringe pattern, and therefore a satisfactory modulation of the scanning signals.

Moreover, in accordance with the invention the contrast again increases at defined distances $Z_n$, starting at the last graduation passed through, i.e., with increasing distance Z, there are also detector planes in which a relatively large contrast in the generated vernier fringe pattern results. Following the known Talbot effect, these detector planes will be called Vernier-Talbot planes in what follows. Generally, in case of collimated illumination the Vernier-Talbot planes are located at distances of $Z_n$, starting at the last graduation passed, wherein the following applies for $Z_n$:

$$Z_n = n^* d_{VT} \text{(Eq. 2)} \qquad \text{Equation 2}$$

Here, n=1, 2, 3 . . .

In what follows, the value $d_{VT}$ will be called the Vernier-Talbot distance and, in accordance with Equation (3), results from:

$$d_{VT} = (\Lambda_{vernier} * TP_{eff})/\lambda \qquad \text{Equation 3}$$

Here $d_{VT}$: means the distance between adjoining Vernier-Talbot planes with a sufficient contrast in the vernier fringe pattern, $\Lambda_{vernier}$: vernier period of the scanned vernier fringe pattern in accordance with Eq. (1); generally, the period of the fringe pattern at the location of the last graduation passed through;

$TP_{eff}$: effective graduation period of the scanning arrangement which correctly describes the directions of the orders of diffraction exiting at the last graduation passed and having a sufficient intensity; with imaging systems, $TP_{eff}$ as a rule corresponds to the last graduation period, in interferential three-grating systems sometimes half or a third of the last graduation period of the last graduation;

$\lambda$: wavelength of the light source used.

In the exemplary embodiment in FIG. 1, $TP_{eff}=TP_M$, i.e. in accordance with Eq. (3), the Vernier-Talbot plane distance $d_{VT}$ is $d_{VT}=(\Lambda_{vernier} * TP_M)/\lambda$.

The excluded case n=0 in Eq. (2) therefore would mean that there is such a suitable detector plane immediately behind the last graduation passed, in which a detector arrangement in accordance with FIG. 2 could then be positioned. If this is not possible for defined structural reasons, the detector arrangement in this exemplary embodiment is arranged in accordance with the invention at the distance $Z_1=1*(TP_M * \Lambda_{vernier})/\lambda$ downstream of the last graduation, i.e., n=1 is selected, etc.

Figure 3:
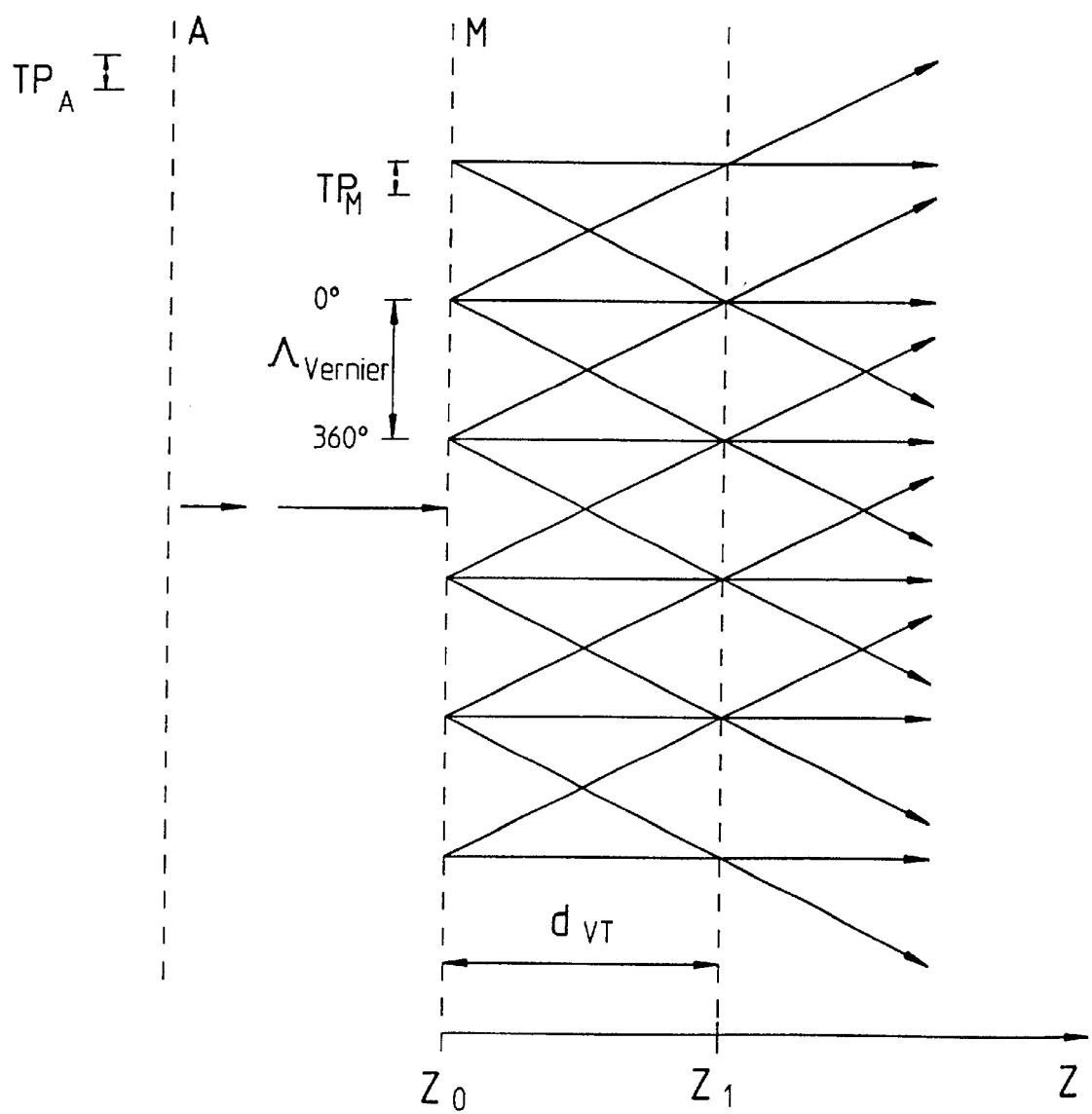
FIG. 3 is a schematic representation for explaining the interrelationship in respect to the optical positioning of the detector plane in connection with imaging position measuring systems.

A schematic, not to scale representation of these matters is shown in FIG. 3, which represents, besides the measuring graduation M and the scanning graduation A, also the various geometric values $TP_M$, $TP_A$, $\Lambda_{vernier}$, $Z_n$ and $d_{TV}$ used in Equations (2) and (3). Moreover, it is indicated in the representation if FIG. 3 why suitable detector planes of sufficient contrast result at periodic distances $d_{VT}$. Based on the vernier effect, vernier fringes occur immediately after the last graduation passed. However, the spreading beams do not have a uniform spreading direction. Instead, different orders of diffraction exist, depending on the graduation perimeters selected. Thus, at the last graduation passed upstream of the detector arrangement—in this case the measuring graduation M—not only do beams of the zeroth order of diffraction occur, but +/– first and higher orders of diffraction are spread in the direction of the downstream located detector arrangement. The fine splitting of the individual orders of propagation because of the vernier effect, by means of whose interference the individual partial vernier fringes are created at all, is neglected here.

If such an order of infraction is observed in isolation, the same vernier fringe pattern occurs as when observing the entire light beam with all superimposed orders of diffraction. Thus, each order of diffraction has a partial vernier fringe pattern in the graduation direction x. While there is still a phase-correct superimposition of the various vernier fringe patterns in the plane of the last passed graduation M, the phase relationships change thereafter because of the different directions of spread. At the mentioned distances $Z_n$ starting at the last graduation, however, high-contrast vernier fringe patterns are again present, since the partial vernier fringe patterns of different orders of diffraction are again superimposed at the correct phase.

In actual use, the detector planes at the distances $Z_1$ and $Z_2$ starting from the last graduation M are here of particular importance, since with even larger values of n, the nonoptimally collimated illumination possibly becomes additionally negatively noticeable, i.e. reduces the contrast.

Thus, the described effect is very similar to the known self-imaging of gratings, known as the Talbot effect. The above described self-imaging of vernier fringe systems is therefore called the Vernier-Talbot effect; the value $d_{VT}$, the Vernier-Talbot distance.

Numerical values of the parameters of a further, second exemplary embodiment of the optical position measuring system of the invention will be recited in what follows, which is also laid out as an imagining system and has a basic structure analogous with the example in FIG. 1.

Here, an imaging system will be defined as one wherein without a vernier effect there is no requirement for a separation of the orders of diffraction which exit, since all intensity modulations of the individual orders of diffraction worth mentioning are approximately equal-phased and therefore do not cancel each other out. The graduations of such imaging systems which are passed through last are designed as amplitude gratings as a rule.

An LED or a semiconductor laser is employed as the light source for this further, second embodiment variation of the position measuring system in accordance with the invention, which provides a wavelength $\lambda=860$ nm. The optical axis of the light source is arranged tilted on the scanning plate by the angle $\epsilon=30°$ in respect to the normal line in the direction of the longitudinal axis of the graduation area. Initially, the beams emitted by the light source first reach a scanning graduation on the transparent scanning plate, which is embodied as a phase grating and has alternatingly arranged graduation areas in the shape of bars and gaps. The phase grating of the scanning graduation has a scanning graduation period $TP_A=37.04$ μm, a phase depth $\psi=\pi$, as well as a ratio of bar widths to graduation periods $\tau=0.5$, i.e. in the measuring direction x one bar has the width of a gap. Following the splitting of the beams falling on the phase grating, the diffracted beams reach the reflection measuring graduation. This is embodied as an amplitude grating with alternatingly arranged reflecting lines and non-reflecting gaps and has a graduation period $TP_M=20$ μm$\neq TP_A/2$, as well as a ratio of bar widths to graduation periods $\tau=0.5$. From there, the beams are again reflected back in the direction toward the scanning plate, where they pass through its transparent window and then finally impinge on the detector arrangement. In the end, the resultant vernier fringe pattern is detected there which, with the recited variation in accordance with Eq. (1), has a vernier period $\Lambda_{vernier}=1/((2/TP_A)-(1/TP_M))$. In this case, the detector arrangement is placed at the distance $Z_1=(\Lambda_{vernier}*TP_M)/\lambda$ starting from the last graduation passed through, and can be embodied analogous to the example in FIG. 2, so that the finally desired number of phase-shifted scanning signals results on the output side. As a rule, the detector arrangement here is of such a size that either three scanning signals, phase-shifted by 120°, or four scanning signals, phase-shifted by 90°, result. In this exemplary embodiment the signal period of the detected scanning signals otherwise corresponds to the measuring graduation period $TP_M$. As in the first exemplary embodiment, for the sake of completeness the two values η and β, which will be explained in what follows, will already be stated: η=0, β=1.

While up to now the conditions in respect to imagining position measuring systems have been explained, by means of the following description of further exemplary embodiments in the form of interferential position measuring devices it is intended to make it clear that the concepts in accordance with the invention can also be employed in connection with such systems.

Figure 4:
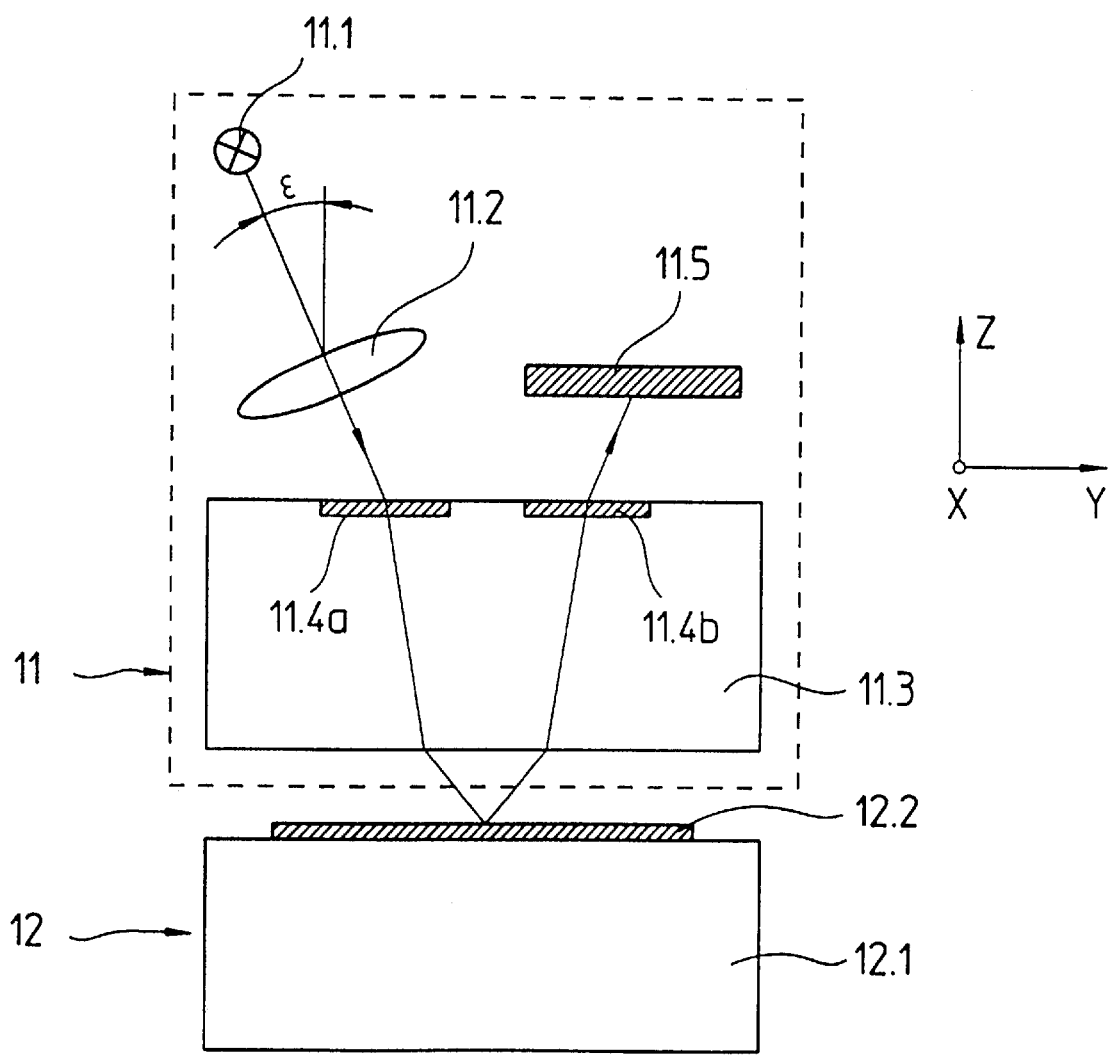
FIG. 4 is a schematic representation of a second exemplary embodiment of the position measuring system of the invention, designed as an interferential position measuring system.

Here, FIG. 4 represents a second exemplary embodiment of the optical measuring system in accordance with the invention, here embodied as an interferential position measuring system, in a schematic lateral view.

Again, the position measuring system comprises a scanning unit 11, which is arranged displaceable in the measuring direction x in respect to a scale 12, wherein the latter includes a measuring graduation support 12.1, as well as of a measuring graduation 12.2 arranged on it. In this representation, the measuring direction x is considered to be oriented perpendicularly in respect to the drawing plane.

A light source 11.1 is a part of the scanning unit 11 and is embodied as an LED or suitable semiconductor laser, whose optical axis is arranged in the line direction tilted onto the top of the transparent scanning plate 11.3 at an angle with respect to the normal line. Downstream of the light source 11.1, an optical collimator device 11.2 is arranged, through which the beams emitted by the light source 11.1 pass before they impinge on a first partial area of the scanning graduation 11.4a, which in this example is arranged on the top of scanning plate 11.3. As in the previous exemplary embodiments, the scanning graduation 11.4a is designed as a phase grating, and has a scanning graduation period $TP_A=15.75$ μm, a phase depth $\psi=\pi$, as well as a ratio of bar widths to graduation periods $\tau=0.5$. Reference is made to the above exemplary embodiments in regard to the different grating parameters. Here, the splitting of the impinging beams into different orders of diffraction takes place at the scanning graduation 11.4a, thereafter the diffracted beams impinge on the reflection measuring graduation 12.2. Now this is also designed as a phase grating, having the graduation period $TP_M=8$ μm$\neq 0.5*TP_A$, the phase depth $\psi=\pi$ and the ratio of bar widths to graduation periods $\pi=0.5$. Following reflection in the direction of the again diffracted beams in the direction of the scanning plate 11.3, they impinge on the second partial area of the scanning graduation 11.4b, after which a union of the various split beams takes place. After passage through the scanning graduation 11.4b, which in this case represents the last graduation to be passed through, a vernier fringe pattern again results having a vernier period $\Lambda_{vernier}=1/((4/TP_A)-(2/TP_M))$. The vernier period $\Lambda_{vernier}$ again results from the Equation (1) already mentioned above. As in the previously mentioned two exemplary embodiments, the two values η and β, which will be explained in what follows, will be already stated: η=0.5, β=1.

The phase-correct superimposition of the different partial vernier fringes spreading in different directions of diffraction again occurs only at defined distances $Z_n$ starting from the last graduation in this example, too. A resultant vernier fringe pattern with sufficient contrast only appears at these distances and can be detected with the aid of the detector arrangement 11.5. As indicated, the detector arrangement 11.5 has a basic structure corresponding to the structure in the example of FIG. 2. For the distances, or respectively spacings, $Z_n$ of optical detector planes from the last graduation passed through, it is necessary to take into consideration that the partial vernier fringes are already phase-shifted in respect to each other in the plane of the last graduation passed through. It is necessary to compensate this phase shift by appropriately changed distances $Z_n$. The following Equation (4) now applies:

$$Z_n=(n+\eta)*d_{VT} \quad \text{Equation 4}$$

The following applies here:

n=0, 1, 2, 3, ..., $d_{VT}$: The distance of adjoining detector planes, or respectively Vernier-Talbot planes, with sufficient contrast of the vernier fringe pattern; this is determined in accordance with Eq. (3).

η: Phase shift of the vernier partial fringe pattern exiting at the last graduation into different directions and passed through in fractions of 360°, this phase shift corresponds to the phase shift of the exiting orders of diffraction in respect to each other at any location in the plane of the last graduation passed. In the case of the above exemplary embodiment in FIG. 4, there is a phase shift of 180°, i.e. η then is η=0.5; 0≦η<1.

In this example, $d_{VT}=(\Lambda_{vernier}*TP_M)/\lambda$ applies for the value $d_{VT}$. Thus, in accordance with the Equation (4) therefore no or only a slight modulation of the scanning signals, or respectively only a slight contrast in the vernier fringe pattern, is to be expected directly downstream of the last graduation passed through. For 0≦η<1, the first possible detector plane therefore lies at a distance $Z_0$.

In general, in accordance with the invention η=0 and n>0 is selected with imagining systems, with interferential systems however η≠ and n=0, 1, 2, 3, . . .

If in contrast to the exemplary embodiment represented, the scanning graduation 11.4a, 11.4b is not arranged on the top of the scanning plate 11.3 oriented toward the light source, but instead the scanning graduation 11.4b is arranged on the underside of the scanning plate 11.3 oriented toward the measuring graduation 12.2, the detector arrangement 11.5 could be attached directly on the top of the scanning plate 11.3 by means of a suitable selection of the thickness of the scanning plate 11.3, which would then correspond to the case that n=0. With such an embodiment it would also be possible to achieve the contacting of the detector arrangement 11.5 via the scanning plate 11.3. For example, this could take place by means of known chip-on-glass technology and/or flip-chip technology.

In this exemplary embodiment, the signal period SP of the detected scanning signals otherwise corresponds to half the measuring graduation period $TP_M$, i.e. $SP=TP_M/2=4$ μm.

A changed form of the embodiment in FIG. 4 will be shown in what follows, i.e. the now third exemplary embodiment of the present invention, which again is designed as an interferential system. Again, the scanning graduation 11.4a, 11.4b is designed as a phase grating and has a graduation period $TP_A=8$ μm, a phase depth $\psi=(2/3)\pi$, as well as a ratio of bar widths to graduation periods τ0.34. The measuring graduation 12.1 has a graduation period $TP_M=7.874$ μm≠$TP_A$, a phase depth $\psi=\pi$, and a ratio of bar widths to graduation periods τ=0.5. From Eq. (1), here the vernier period $\Lambda_{vernier}$ is $\Lambda_{vernier}=1/((2/TP_A)-(2/TP_M))$. In this case, η=⅓ applies for the value β=1 again applies for the value β, which will be explained in what follows.

Figure 5:
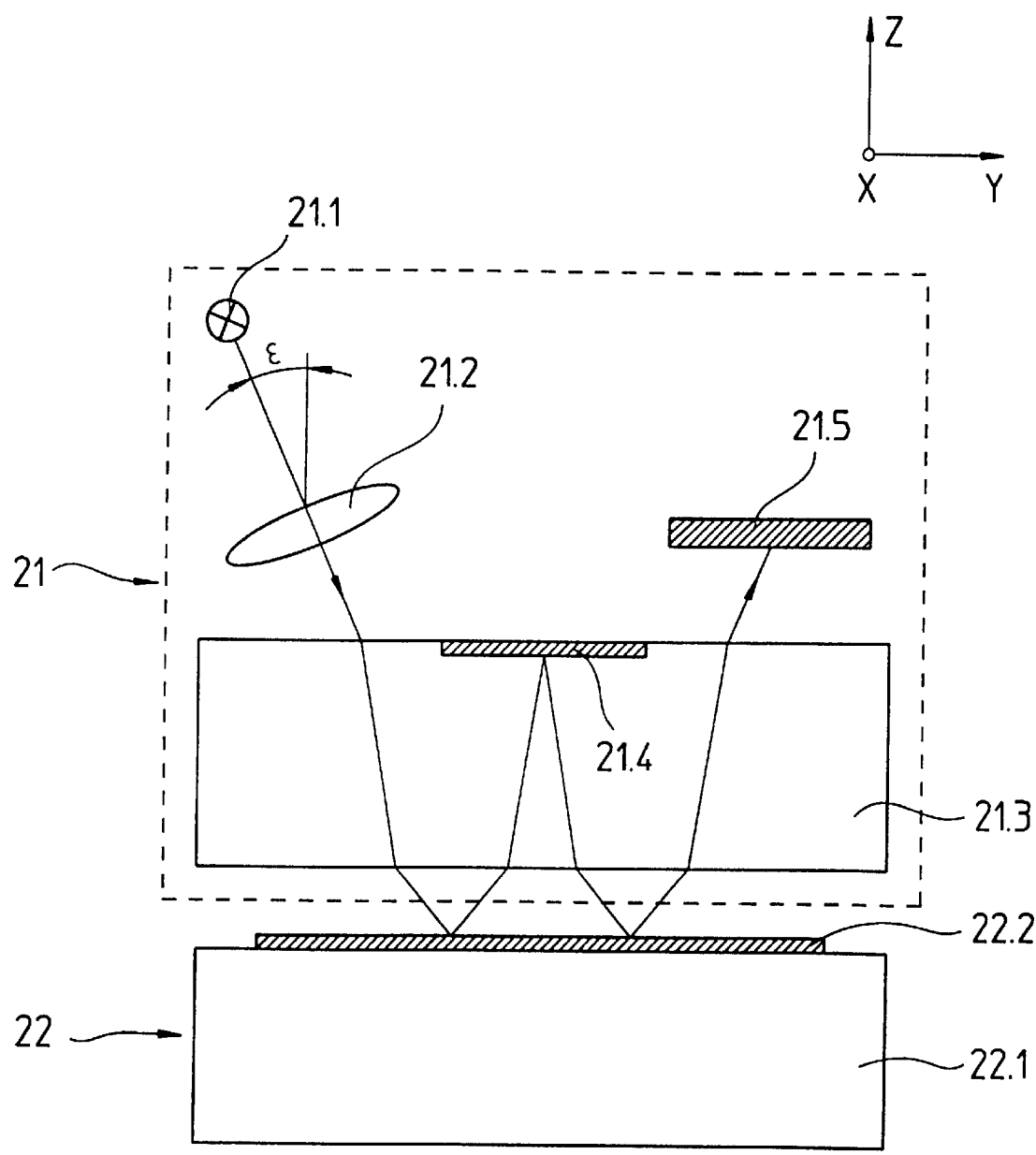
FIG. 5 is a schematic representation of a third exemplary embodiment of the position measuring system of the invention, designed as an interferential position measuring system.

A further embodiment of an interferential optical position measuring system in accordance with the invention and thus the altogether fifth exemplary embodiment within the scope of the present invention is represented in FIG. 5.

The position measuring system again comprises a scanning unit 21, which is arranged displaceable in the measuring direction x in respect to a period 22.2, wherein the measuring direction x is again oriented perpendicularly in respect to the drawing plane. In a particularly advantageous embodiment, the measuring graduation 22.2 is designed as a flexible measuring tape.

A light source 21.1 is provided on the side of the scanning unit 21 and is embodied as an LED or suitable semiconductor laser, whose optical axis is arranged in the line direction tilted in respect to the top of the transparent scanning plate 21.3 at an angle ε. An optical collimator device 21.2 is arranged downstream of the light source 21.1, through which the beams emitted by the light source 21.1 pass before they pass through the scanning plate 21.3 in a transparent, optically non-effective area. After passing through the scanning plate 21.3, the beams reach the measuring graduation 22.2, which is designed as a reflecting phase grating, for the first time. The latter has a measuring graduation period $TP_M=16$ μm, the phase depth $\psi=\pi$ and the ratio of bar widths to graduation periods τ=0.5. From the measuring graduation 22.2, the beams are reflected back in the direction of the scanning plate 21/3 to a scanning graduation 21.4 arranged there, which has been placed on the inside of the top of the scanning plate 21.3. The scanning graduation 21.4 provided is designed as a reflecting phase graduation, having the scanning graduation period $TP_A=7.874$ μm≠$0.5*TP_M$, a phase depth $\psi=\pi$, as well as a ratio of bar widths to graduation periods τ=0.5. Regarding the definition of the different grating parameters, reference is again made to the above exemplary embodiments. A back reflection of the diffracted beams into the direction of the measuring graduation 22.2 takes place from the scanning graduation 21.4, and from there a second reflection in the direction of the scanning plate 21.3 again takes place. The beams coming from the measuring graduation 22.2 pass through a transparent area of the scanning plate 21.3 before the vernier fringe pattern resulting downstream of the last passed graduation 22.2 is detected by means of a detection arrangement 21.5. Again, the latter is arranged in a suitable detection plane. The vernier fringe pattern detected in the course of this has a vernier period which, in accordance with the above-mentioned Equation (3), results as $\Lambda_{vernier}=1/((4/TP_M)-(2/TP_A))$. Moreover, β=1, η½.

In this case, too, the above Equation (4), where η½, applies to the distances $Z_n$, in which the phase-correct superimposition of the different partial vernier fringe patterns occurs. Accordingly, the placement of the detector arrangement 22.5, etc. also takes place in these planes.

It again turns out that only a slight modulation of the detected scanning signals is to be expected directly downstream of the graduation last passed, which in this case is the measuring graduation 22.2. The first scanning plane possible in principle, with n=0, is also not shown as optimal in this configuration, since with the given parameters it would be located between the measuring graduation 22 and the scanning plate 21.3. For this reason the detector arrangement 21.5 is placed into the detector plane at the distance $Z_1$ (n=1) from the last graduation passed where, in accordance with the invention, a vernier fringe pattern of sufficient contrast can be detected.

In this exemplary embodiment, the signal period SP of the detected scanning signals results in $SP=TP_M/4$.

In a further variation of the embodiment in accordance with FIG. 5, i.e. in a fifth exemplary embodiment of the present invention, the following parameters are selected. $TP_M\neq TP_A$, phase depth $\psi=\frac{2}{3}\pi$, ratio of bar widths to graduation periods τ≈0.34, applies to the measuring graduation 22.2 designed as a phase grating. $TP_A\neq TP_M$, phase depth $\psi=\pi$, ratio of bar widths to graduation periods τ=0.5, and furthermore β=1, η=⅓, applies to the scanning graduation period, also embodied as a phase grating.

There are again several options regarding the arrangement of the scanning graduation 21.4 on the scanning side 21.3. Thus, the scanning graduation 21.4 can be arranged directly on the top of the scanning plate 21.3, which results in a reduced sensitivity to degradation. However, when selecting the appropriate thickness of the scanning plate 21.3, it is also possible in the same way to arrange the scanning graduation 21.4 on the side of the scanning plate 21.3 oriented toward the measuring graduation. With this variation the detector arrangement 21.5 could be placed directly on the surface of the scanning plate 21.3.

Further embodiment variations of the optical position measuring system, which are also based on considerations in accordance with the invention, will be discussed in what follows.

For example, the measuring graduation 22.2 in the exemplary embodiment of FIG. 5 could be arranged in a curved shape on the inside or outside of a rotating cylinder. In this case the axis of rotation of the cylinder is oriented in the y-direction. Because of the curved arrangement of the measuring graduation 22.2 in such a variation, the result in this case is an enlargement or a reduction of the vernier fringe pattern to be scanned in the detector plane. In the case of the arrangement of the measuring graduation on the outside of the cylinder, an enlargement results, in case of the arrangement of the measuring graduation on the inside of the cylinder, a corresponding reduction. In the case of a curved measuring graduation, this optical effect can be taken into consideration in the above Eq. (3) in the same way as for further cases having non-collimated beams, which are caused, for example, by arbitrarily focusing or scattering optical elements in the beams paths. To this end an enlargement, or respectively correction factor β is introduced, which describes the transmission, or respectively enlargement, of the partial vernier fringe period from the location of the last passed graduation to the detector plane. The result therefore is the general Equation (3'):

$$d_{VT}=(\beta*\Lambda_{vernier}*TP_{eff})/\lambda \qquad \text{Equation 3'}$$

or respectively:

$$d_{VT}=\beta*d_{VTO},$$

wherein:

$$d_{VTO}=(\Lambda_{vernier}*TP_{eff})/\lambda,$$

and $\Lambda_{vernier}$: Vernier period of the partial vernier fringe at the location of the last graduation passed.

Figure 6:
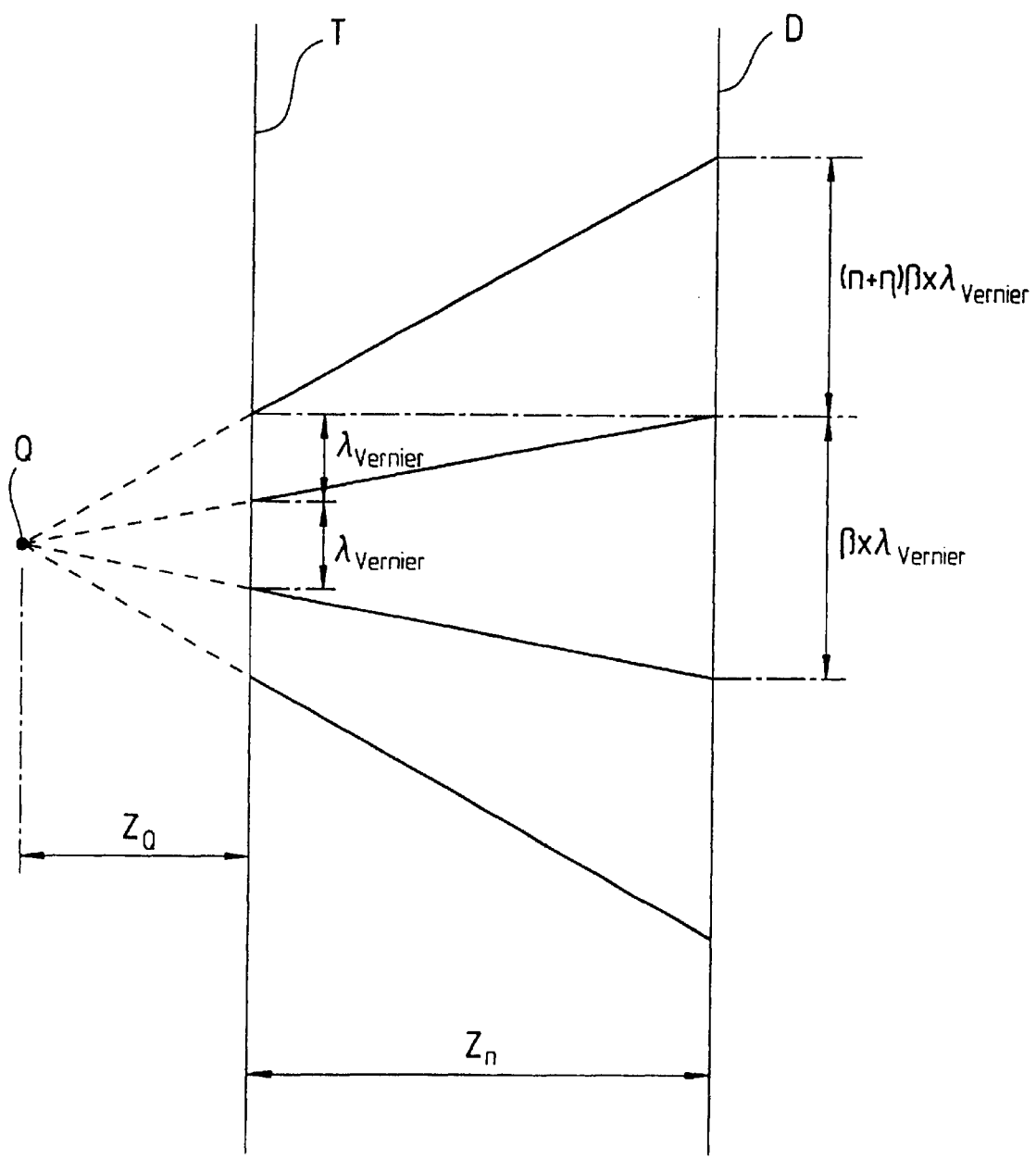
FIG. 6 is a schematic representation for explaining the circumstances in the case of non-collimated illumination.

Of course, the enlargement factor β being entered into the general Equation (3') is a function of defined geometric values within the position measuring system of the invention. Reference is made to FIG. 6 in this connection, which is used to explain the relevant values by which the factor β is defined. Besides the last graduation T passed, in whose plane there is a partial vernier fringe pattern of the vernier period $\Lambda_{vernier}$, the detector plane D at the distance $Z_n$ from the graduation T is furthermore represented in FIG. 6, in which a vernier fringe pattern enlarged by the factor β is present because of the divergent beam paths there. In this case, the point Q also indicated in FIG. 6 can be considered to be a virtual, or respectively real, source point of the beam, or respectively of the vernier fringe pattern. Thus, the distance $Z_Q$ indicates the distance of the real or virtual source point from the graduation T last passed. In the case where β>1, i.e. the case of the enlargement of the vernier fringe pattern, $Z_Q$>0 applies to the distance $Z_Q$; in the case where β<1, i.e. the case of a theoretical reduction of the fringe pattern, however, $Z_Q$<0 applies.

In accordance with the laws of centric extension, in case of such a geometry the following therefore applies to the enlargement, or respectively reduction factor:

$$\beta=(Z_n+Z_Q)/Z_Q.$$

For the above mentioned case of the arrangement of the measuring graduation on the outside of the cylinder, the factor β>1 should be selected; but in case of the arrangement of the measuring graduation on the inside of the cylinder, β<1 should be selected.

Thus, from the Equation (4), as well as the above explained Equation (3'), the Equation (5), which applies to all systems in accordance with the invention, follows, from which the position of the detector planes, respectively their distances $Z_n$ from the last graduation passed, can be determined:

$$1/Z_n+1/Z_Q=1/((n+\eta)*d_{VTO}) \qquad \text{Equation 5}$$

The meaning of the values $Z_Q$, n and η appearing in Eq. (5) have already been explained above. In the same way, the definition of the value $d_{VTO}$ had already been mentioned, wherein the vernier period $\Lambda_{vernier}$ is inserted into its definition.

While in the discussed imaging systems the vernier period $\Lambda_{vernier}$ can be analytically determined in accordance with Eq. (1), in the case of a non-collimated illumination, or respectively when using optical elements in the beam path which affect the divergence of the beams, providing an unequivocal analytical expression for the vernier period $\Lambda_{vernier}$ analogously with Eq. (1) is not possible. With these optical conditions, the vernier period $\Lambda_{vernier}$ can only be expressed in relationships specially adapted to the optical givens; alternatively, the determination of the vernier period $\Lambda_{vernier}$ in such systems is also possible by means of numerical methods, such as the so-called "ray tracing."

Basically, the vernier period $\Lambda_{vernier}$ in the general equation (5) therefore should be understood to be the period of the partial vernier fringes at the location of the last graduation passed.

As already indicated, the Equation (5) is valid for the case of non-collimated illumination, as well as for the case of collimated illumination. In the latter case, the value $Z_Q$ would have to be selected as $Z_Q=\infty$, i.e. β=1, so that the Equation (5) is again identical with the above discussed Equation (4). Conversely, in case of non-collimated illumination, the value $Z_Q$ is finite, i.e. $Z_Q\neq\infty$, and therefore , β≠1.

The case where the value $Z_Q$ in Equation (5) is selected to be $Z_Q=(n+\eta)*d_{VTO}$, and n=1, 2, . . . , will be discussed in what follows. A vernier fringe pattern at the distance $Z_n=\infty$ then results from the last graduation passed. In actual use it is then necessary to place the detector arrangement into the focal plane of a focusing lens arranged downstream of the last graduation.

It is of course possible in principle to also place so-called optical relay devices downstream of the last graduation, which generate an image of the detector plane resulting in accordance with Eq. (5) in another plane.

Finally it should be pointed out that, if the value η is appropriately selected, the Equation (5) introduced above for the case of interferential systems also applies to imaging position measuring systems; as already discussed, in this case it is necessary to select η=0.

This in turn means that the mentioned Equations (3') and (5) have general validity, and that it is possible by the appropriate selection of the various parameters of the discussed imaging and interferential variations of the optical position measuring system of the invention to describe them correctly. Here, these equations also describe the known case of optical position measuring systems, such as imaging systems in accordance with DE 195 27 287 A1, mentioned at the outset. The detector plane is placed there almost directly downstream of the last graduation passed, and the resulting vernier fringe pattern is detected, i.e. with such position measuring systems the parameters n and η must be selected as n≈0 and η=0. Thus, for the optical position measuring systems in accordance with the invention, the parameters n and η in the generally valid Equations (3') and (5) must be selected to be n>0 or η≠0.

Basically it should also be noted here that of course a certain tolerance in regard to the exact position of the respective detector plane exists. In this way it is possible to achieve a possibly sufficient intensity modulation even with small deviations from the ideal position resulting in accordance with the above equations.

It should moreover be mentioned that within the scope of the present invention the detection of a periodic fringe pattern which extends perpendicularly in respect to the measuring direction in the form of a so-called moiré fringe, is possible if, for example, one of the graduations used is embodied as a two-dimensional graduation so that therefore orders of diffraction are emitted transversely, deflected in the direction of the moiré fringes. Alternatively, the generation of such moiré fringes can be of course achieved in a known manner in that the graduations used are arranged turned at a defined angle in respect to each other.

The invention may be embodied in other forms than those specifically disclosed herein without departing from its spirit or essential characteristics. The described embodiments are to be considered in all respects only as illustrative and not restrictive, and the scope of the invention is commensurate with the appended claims rather than the foregoing description.

We claim:

1. An optical position measuring system for determining the relative position of a first object which can be moved with respect to a second object along a measuring direction, the system comprising:
   at least one periodic measuring graduation, which is connected to said first object;
   a scanning unit which is connected with said second object, said scanning unit comprising:
   a light source emitting beams of light;
   at least one scanning graduation; and
   a detector arrangement in a detector plane, comprising several radiation sensitive detector elements for scanning a periodic fringe pattern resulting from the interaction of the beams of light emitted by said light source with said at least one periodic measuring graduation and said at least one scanning graduation, wherein the detector plane is arranged spaced at a distance $Z_n$ from the last graduation passed and the distance $Z_n$ is calculated from the following equation:

$$1/Z_n + 1/Z_Q = 1/((n+\eta)^* d_{VTO}),$$

wherein:
   $Z_Q$: is the distance of the last graduation passed from a real and virtual source point of the periodic fringe pattern,
   n=0, 1, 2, 3, . . . ,
   η: is the phase shift in fractions of 360° of the periodic fringe pattern exiting at the last graduation passed into different directions, $$d_{VTO} = (TP_{eff} * \Lambda_{vernier})/\lambda,$$

wherein
   $TP_{eff}$: is an effective graduation period of the scanning device, which correctly describes the directions of the orders of diffraction exiting at the graduations last passed, which have sufficient intensity,
   λ: wavelength of said light source,
   $\Lambda_{vernier}$: period of said partial vernier fringe at the location of the last graduation passed.

2. An optical position measuring system for determining the relative position of a first object which can be moved with respect to a second object along a measuring direction, the system comprising:
   at least one periodic measuring graduation, which is connected to said first object;
   a scanning unit which is connected with said second object, said scanning unit comprising:
   a light source emitting beams of light;
   at least one scanning graduation; and
   a detector arrangement in a detector plane, comprising several radiation sensitive detector elements for scanning a periodic fringe pattern resulting from the interaction of the beams of light emitted by said light source with said at least one periodic measuring graduation and said at least one scanning graduation, wherein the detector plane is arranged spaced at a distance $Z_n$ from the last graduation passed and the distance $Z_n$ is calculated from the following equation:

$$1/Z_n + 1/Z_Q = 1/((n+\eta)^* d_{VTO}),$$

wherein:
   $Z_Q$: is the distance of the last graduation passed from a real and virtual source point of the periodic fringe pattern,
   n=0, 1, 2, 3, . . . ,
   η: is the phase shift in fractions of 360° of the periodic fringe pattern exiting at the last graduation passed into different directions, $$d_{VTO} = (TP_{eff} * \Lambda_{vernier})/\lambda,$$

wherein
   $TP_{eff}$: is an effective graduation period of the scanning device, which correctly describes the directions of the orders of diffraction exiting at the graduations last passed, which have sufficient intensity,
   λ: wavelength of said light source,
   $\Lambda_{vernier}$: period of said partial vernier fringe at the location of the last graduation passed; and
   wherein the detector elements are arranged in the measuring direction in blocks with respect to each other, wherein at least two of said blocks are provided, and respectively k individual detector elements per block are arranged at the distance , $\beta^* \Lambda_{vernier}$, with $\beta = (Z_Q + Z_n)/Z_Q$, and wherein the arrangement of the detector elements furthermore is made in such a way that scanning signals, which are phase-shifted by 360°/k, result from the adjoining detector elements of each block in the course of scanning.

3. The optical position measuring system in accordance with claim 2, wherein the respective detector elements of the at least two blocks, which provide equal-phased output signals, are connected with each other.

4. The optical position measuring system in accordance with claim 1, wherein the following applies for the distance $d_{VT}$ between adjoining detector planes:

$$d_{Vt} = \beta^* d_{VTO},$$

wherein $\beta=(Z_Q+Z_n)/Z_Q$.

5. The optical position measuring system in accordance with claim 1, wherein a collimated illumination with $Z_Q=\infty$ and $\beta=1$ is provided.

6. The optical position measuring system in accordance with claim 1, wherein a non-collimated illumination with $Z_Q\neq\infty$ and $\beta\neq1$ is provided.

7. The optical position measuring system in accordance with claim 1, wherein $\eta$ is selected to equal 0 and n>0.

8. The optical position measuring system in accordance with claim 1, wherein $\eta$ is selected so as not to equal 0 and n 0, 1, 2, 3, . . .

9. The optical position measuring system in accordance with claim 1, wherein the scanning unit comprises a transparent scanning plate with one of said at least one scanning graduation with a scanning period $TP_A$, so that the beams emitted by the light source first pass through the one of said at least one scanning graduation, then impinge on one of said at least one measuring graduation with a graduation period $TP_M$, where a back reflection in the direction of the scanning plate takes place, the back reflected beams pass through the scanning plate adjacent to said one of said at least one scanning graduation and reach the detector arrangement in the detector plane.

10. The optical position measuring system in accordance with claim 9, having the following parameters:
   a) for the one of said at least one measuring graduation designed as an amplitude grating:
      $TP_M\neq TP_A$; ratio of bar widths to graduation periods $\tau=0.5$,
   b) for the one of said at least one scanning graduation designed as a phase grating:
      $TP_A\neq TP_M$, phase depth $\psi=\pi/2$, ratio of bar widths to graduation periods $\tau=0.5$,
   c) and furthermore:
      $\eta=0$, $\beta=1$.

11. The optical position measuring system in accordance with claim 9, having the following parameters:
   a) for the one of said at least one measuring graduation designed as an amplitude grating:
      $TP_M\neq 0.5*TP_A$; ratio of bar widths to graduation periods $\tau=0.5$,
   b) for the one of said at least one scanning graduation designed as a phase grating:
      $TP_A\neq 2*TP_M$, phase depth $\psi=\pi$, ratio of bar widths to graduation periods $\tau=0.5$,
   c) and furthermore:
      $\eta=0$, $\beta 1$.

12. The optical position measuring system in accordance with claim 1, wherein the scanning unit comprises a transparent scanning plate with one of said at least one scanning graduation being a transmitting scanning graduation with a scanning period $TP_A$, so that the beams emitted by the light source initially reach a partial area of the one of said at least one scanning graduation, then impinge on a reflecting measuring graduation with a scanning graduation period $TP_M$ and, following back reflection, impinge on a second partial area of the one scanning graduation and pass through the latter before reaching the detector arrangement in the detector plane.

13. The optical position measuring system in accordance with claim 12, having the following parameters:
   a) for the reflecting measuring graduation designed as a phase grating:
      $TP_M\neq 0.5*TP_A$; phase depth $\psi=\pi$, ratio of bar widths to graduation periods $\tau=0.5$,
   b) for the transmitting scanning graduation designed as a phase grating:
      $TP_M\neq 0.5*TP_A$, phase depth $\psi=\pi$, ratio of bar widths to graduation periods $\tau=0.5$,
   c) and furthermore:
      $\beta=1$, $\eta=0.5$.

14. The optical position measuring system in accordance with claim 12, having the following parameters:
   a) for the reflecting measuring graduation designed as a phase grating:
      $TP_M\neq TP_A$; phase depth $\psi=\pi$, ratio of bar widths to graduation periods $\tau=0.5$,
   b) for the transmitting scanning graduation designed as a phase grating:
      $TP_M\neq TP_A$, phase depth $\psi=(\frac{2}{3})\pi$, ratio of bar widths to graduation periods $\tau\approx 0.34$,
   c) and furthermore:
      $\beta=1$, $\eta=\frac{1}{3}$.

15. An optical position measuring system for determining the relative position of a first object which can be moved with respect to a second object along a measuring direction, the system comprising:
   at least one periodic measuring graduation, which is connected to said first object;
   a scanning unit which is connected with said second object, said scanning unit comprising:
      a light source emitting beams of light;
      at least one scanning graduation; and
      a detector arrangement in a detector plane, comprising several radiation sensitive detector elements for scanning a periodic fringe pattern resulting from the interaction of the beams of light emitted by said light source with said at least one periodic measuring graduation and said at least one scanning graduation, wherein the detector plane is arranged spaced at a distance $Z_n$ from the last graduation passed and the distance $Z_n$ is calculated from the following equation:

$1/Z_n+1/Z_Q=1/((n+\eta)*d_{VTO})$, wherein:
      $Z_Q$: is the distance of the last graduation passed from a real and virtual source point of the periodic fringe pattern,
      n=0, 1, 2, 3, . . . ,
      $\eta$: is the phase shift in fractions of 360° of the periodic fringe pattern exiting at the last graduation passed into different directions, $d_{VTO}=(TP_{eff}*\Lambda_{vernier})/\lambda$, wherein
         $TP_{eff}$: is an effective graduation period of the scanning device, which correctly describes the directions of the orders of diffraction exiting at the graduations last passed, which have sufficient intensity,
         $\lambda$: wavelength of said light source,
         $\Lambda_{vernier}$: period of said partial vernier fringe at the location of the last graduation passed; and
      wherein the scanning unit further comprises a transparent scanning plate with one of said at least one scanning graduations being a reflecting scanning graduation with a scanning graduation period $TP_A$ and facing one of said at least one measuring graduation that is a reflecting measuring graduation with a measuring graduation period $TP_M$, so that the beams emitted by the light source first pass through the scanning plate adjacent to the reflecting scanning graduation, then impinge on the reflecting measuring graduation, from which a back reflection in the direction of the reflecting scanning graduation takes place, from which another back reflection to the reflecting measuring graduation takes place before another reflection in the direction of the scanning plate takes place, and the back-reflected beams pass through the scanning plate adjoining the reflecting scanning graduation and reach the detector arrangement in the detector plane.

16. The optical position measuring system in accordance with claim 15, wherein the reflecting measuring graduation is arranged on the outside or inside of a cylinder.

17. The optical position measuring system in accordance with claim 15, wherein the reflecting measuring graduation is designed as a flexible measuring tape.

18. The optical position measuring system in accordance with claim 15, having the following parameters:

a) for the reflecting measuring graduation designed as a phase grating:
  $TP_M \neq 2*TP_A$; phase depth $\psi=\pi$, ratio of bar widths to graduation periods $\tau=0.5$, b) for the reflecting scanning graduation designed as a phase grating:
  $TP_A \neq 0.5*TP_M$, phase depth $\psi=\pi$, ratio of bar widths to graduation periods $\tau=0.5$, c) and furthermore:
  $\beta=1$, $\eta=\frac{1}{2}$.

19. The optical position measuring system in accordance with claim 15, having the following parameters:

a) for the reflecting measuring graduation designed as a phase grating:
  $TP_M \neq TP_A$, phase depth $\psi=\frac{2}{3}\pi$, ratio of bar widths to graduation periods $\tau \approx 0.34$, b) for the reflecting scanning graduation designed as a phase grating:
  $TP_M \neq TP_A$, phase depth $\psi=\pi$, ratio of bar widths to graduation periods $\tau=0.5$, c) and furthermore:
  $\beta=1$, $\eta=\frac{1}{3}$.

* * * * *

UNITED STATES PATENT AND TRADEMARK OFFICE
CERTIFICATE OF CORRECTION

PATENT NO.    : 6,552,810 B1
DATED         : April 22, 2003
INVENTOR(S)   : Michael Hermann et al.

It is certified that error appears in the above-identified patent and that said Letters Patent is hereby corrected as shown below:

<u>Title page,</u>
Item [57], ABSTRACT,
Line 32, delete "$T_{peff}$:" and substitute -- $TP_{eff}$: -- in its place.
Line 37, delete "$\Lambda_{vemier}$:" and substiute -- $\Lambda_{vernier}$: -- in its place.

<u>Column 16,</u>
Line 53, immediately after "distance" delete "," (comma).

<u>Column 17,</u>
Line 14, delete "n 0," and substitute -- n=0, -- in its place.
Line 51, delete "β1." and substitute -- β=1. -- in its place.

Signed and Sealed this

Eleventh Day of May, 2004

JON W. DUDAS
*Acting Director of the United States Patent and Trademark Office*